United States Patent
McEwan et al.

(10) Patent No.: US 8,336,309 B2
(45) Date of Patent: Dec. 25, 2012

(54) TURBOCHARGER WITH DUAL WASTEGATE

(75) Inventors: Jim McEwan, Huddersfield (GB); Lee Robinson, Huddersfield (GB)

(73) Assignee: Cummins Turbo Technologies Limited, Huddersfield (GB)

(*) Notice: Subject to any disclaimer, the term of this patent is extended or adjusted under 35 U.S.C. 154(b) by 434 days.

(21) Appl. No.: 12/315,264

(22) Filed: Dec. 1, 2008

(65) Prior Publication Data
US 2009/0151352 A1    Jun. 18, 2009

Related U.S. Application Data

(63) Continuation of application No. PCT/GB2007/002014, filed on May 31, 2007.

(30) Foreign Application Priority Data

May 31, 2006 (GB) .................................. 0610691.8

(51) Int. Cl.
*F02D 23/00* (2006.01)
*F16K 11/16* (2006.01)
*F16K 31/00* (2006.01)
*F16K 39/00* (2006.01)
*F02B 37/12* (2006.01)
*F02B 37/02* (2006.01)
*F02B 37/18* (2006.01)

(52) U.S. Cl. ..................... 60/602; 137/607; 137/601.01; 137/601.05

(58) Field of Classification Search ............ 60/602; 137/601.01, 601.02, 601.03, 601.15, 607; 137/601.5; 251/279, 359; *F02B 37/12, 37/02*
See application file for complete search history.

(56) References Cited

U.S. PATENT DOCUMENTS

| | | | | |
|---|---|---|---|---|
| 618,227 | A | * | 1/1899 | Hawes .......................... 137/607 |
| 1,043,077 | A | * | 11/1912 | Whidden ....................... 137/607 |
| 1,310,682 | A | | 7/1919 | Sherbondy ..................... 60/602 |
| 1,641,561 | A | * | 9/1927 | Whidden ....................... 137/607 |
| 2,199,259 | A | * | 4/1940 | Hersey ............................ 60/602 |
| 2,726,679 | A | * | 12/1955 | Countryman ................. 137/607 |
| 3,205,879 | A | * | 9/1965 | Von Seggern et al. ........ 123/581 |
| 3,897,524 | A | * | 7/1975 | Freismuth et al. ....... 137/601.05 |

(Continued)

FOREIGN PATENT DOCUMENTS

DE    4445489    6/1996

(Continued)

OTHER PUBLICATIONS

Great Britain Search Report, GB0610691.8, Sep. 29, 2006.

(Continued)

*Primary Examiner* — Thai Ba Trieu
(74) *Attorney, Agent, or Firm* — Krieg DeVault LLP

(57) ABSTRACT

A turbocharger wastegate valve assembly comprises a first bypass port communicating with a first portion of an exhaust inlet and a first valve member adapted for engaging and sealing a first valve seat surrounding the first bypass port. The valve assembly further comprises a second bypass port communicating with a second portion of an exhaust inlet and a second valve member adapted for engaging and sealing a second valve seat surrounding the second port. A shaft supports each valve member for rotation about a shaft axis to lift both the first and second valve members from sealing engagement with the first and second valve seats respectively. The first valve seat is inclined relative to the second valve seat and the shaft has freedom of movement in the axial direction.

20 Claims, 4 Drawing Sheets

U.S. PATENT DOCUMENTS

| | | | | |
|---|---|---|---|---|
| 3,934,851 A | * | 1/1976 | Illing | 251/248 |
| 4,075,849 A | | 2/1978 | Richardson | |
| 4,294,205 A | * | 10/1981 | Iiyama et al. | 137/607 |
| 4,391,098 A | * | 7/1983 | Kosuge | 60/602 |
| 4,443,153 A | * | 4/1984 | Dibelius | 60/602 |
| 4,611,465 A | * | 9/1986 | Kato et al. | 60/602 |
| 4,617,799 A | * | 10/1986 | Todokoro et al. | 60/602 |
| 4,730,456 A | * | 3/1988 | Tadokoro et al. | 60/602 |
| 4,794,758 A | * | 1/1989 | Nakazawa et al. | 60/602 |
| 4,825,523 A | * | 5/1989 | Nakazawa et al. | 60/602 |
| 5,046,317 A | | 9/1991 | Satokawa | 60/602 |
| 5,427,141 A | * | 6/1995 | Ohtsubo | 137/595 |
| 5,996,348 A | | 12/1999 | Watkins | 60/602 |
| 6,941,926 B2 | * | 9/2005 | Fagala | 123/336 |
| 7,121,088 B2 | * | 10/2006 | Lavin | 137/607 |

FOREIGN PATENT DOCUMENTS

| | | | |
|---|---|---|---|
| DE | 198 53 392 | | 11/1998 |
| EP | 0048027 | | 3/1982 |
| GB | 2038940 | | 7/1980 |
| GB | 2066365 | | 7/1981 |
| JP | 57-137619 | | 8/1982 |
| JP | 62-183033 | | 11/1987 |
| JP | 05156958 A | * | 6/1993 |
| JP | 2000064847 A | * | 2/2000 |
| WO | WO 03/033950 A1 | | 4/2003 |
| WO | WO 2007/138325 | | 12/2007 |

OTHER PUBLICATIONS

International Search Report, PCT/GB2007/002014, Nov. 22, 2007.

* cited by examiner

TURBOCHARGER WITH DUAL WASTEGATE

CROSS REFERECE TO RELATED APPLICATIONS

The present application is a continuation of PCT/GB2007/002014 filed on May 31, 2007 which claims the benefit of United Kingdom Patent Application No. GB0610691.8, filed May 31, 2006, both of which are incorporated herein by reference.

BACKGROUND

The present invention relates to a wastegated turbocharger. In particular, the invention relates to a dual wastegate port and valve assembly for a turbocharger provided with a divided inlet turbine.

Turbochargers are well known devices for supplying air to the intake of an internal combustion engine at pressures above atmospheric pressure (boost pressures). A conventional turbocharger essentially comprises an exhaust gas driven turbine wheel mounted on a rotatable shaft within a turbine housing connected downstream of an engine outlet manifold. Rotation of the turbine wheel rotates a compressor wheel mounted on the other end of the shaft within a compressor housing. The compressor wheel delivers compressed air to the engine intake manifold. The turbocharger shaft is conventionally supported by journal and thrust bearings, including appropriate lubricating systems, located within a central bearing housing connected between the turbine and compressor wheel housings.

In known turbochargers, the turbine stage comprises a turbine chamber within which the turbine wheel is mounted. An annular inlet passageway is defined between facing radial walls arranged around the turbine chamber. An inlet volute is arranged around the inlet passageway and an outlet passageway extends from the turbine chamber. The passageways and chambers communicate such that pressurised exhaust gas admitted to the inlet chamber flows through the inlet passageway to the outlet passageway via the turbine and rotates the turbine wheel. It is also known to improve turbine performance by providing vanes, referred to as nozzle vanes, in the inlet passageway so as to deflect gas flowing through the inlet passageway toward the direction of rotation of the turbine wheel.

Turbines may be of a fixed or variable geometry type. Variable geometry turbines differ from fixed geometry turbines in that the size of the inlet passageway can be varied to optimise gas flow velocities over a range of mass flow rates so that the power output of the turbine can be varied to suit varying engine demands. For instance, when the volume of exhaust gas being delivered to the turbine is relatively low, the velocity of the gas reaching the turbine wheel is maintained at a level which ensures efficient turbine operation by reducing the size of the annular inlet passageway. Turbochargers provided with a variable geometry turbine are referred to as variable geometry turbochargers.

A turbocharger turbine may be provided with a valve controlled bypass port referred to as a wastegate, to enable control of the turbocharger boost pressure and/or shaft speed. A wastegate valve (typically a poppet type valve) is controlled to open the wastegate port when the pressure of the boost air increases toward a pre-determined level, thus allowing some of the exhaust gas to bypass the turbine wheel. Typically the wastegate port opens into a bypass passageway which diverts the bypass gas flow to the turbine outlet or vents it to atmosphere. The wastegate valve may be actuated by a variety of means, including electric actuators, but is more typically actuated by a pneumatic actuator operated by boost pressure delivered by the compressor wheel.

Turbochargers intended for installation on an engine with two banks of cylinders may be provided with a turbine which has a divided inlet volute. This provides separate parallel gas inlet flow paths to the turbine wheel from each of the engine cylinder banks so that separate impulses of the exhaust gases will be more effectively transmitted to the turbine wheel. Wastegating of such a divided inlet turbine requires two wastegate ports, one for each separate inlet path, controlled by a dual wastegate valve mechanism.

The provision of a dual wastegate valve mechanism which provides simultaneous opening and closing of dual wastegate ports whilst ensuring each valve seats correctly in a closed position is problematic. Early examples of dual wastegate valve mechanism comprising a pair of valve members mounted to a single support arm is disclosed in Japanese Patent Application laid-open publication no. 57-137619. This discloses a dual wastegate valve mechanism comprising two valve members secured directly to a linking support member so that movement of the support member moves both valve members together. However, even a relatively slight distortion of the support member can result in improper closing of one or both valves so that exhaust gas flow can leak through the respective wastegate port. An improvement on this mechanism is disclosed in Japanese utility model application laid-open publication no. 62-183033. In this mechanism, each valve member is loosely coupled to the support member by a pin which allows some movement of the valve member relative to the support member. This freedom of movement accommodates minor distortion in the support member. However, excessive freedom of movement between each valve member and the support member can result in premature opening of one or other valve member before the boost pressure reaches the predetermined level.

A dual wastegate valve mechanism proposed to further improve upon the mechanisms described above is disclosed in U.S. Pat. No. 5,046,317. In this mechanism, a pair of wastegate valve members (poppets) are loosely mounted to a linking support member and have limited freedom of movement relative to the support member. In addition, the support member is pivotally connected to a support arm at a mid point between the two valve members to allow a small degree of pivoting movement of the support member itself relative to the wastegate ports. The combined freedom of movement of the valve members on the support member, and the support member on the support arm is said to accommodate differences in the valve seat height whilst ensuring each valve member firmly sits properly on its valve seat when the wastegate ports are closed.

Another dual wastegate valve mechanism is disclosed in U.S. Pat. No. 5,996,348. This takes a different approach to the provision of a mechanism which allows the simultaneous opening and closing of the two valve members whilst permitting a limited freedom of movement between the two valve members. Each valve member (poppet) is mounted to a respective arm extending at an angle from a respective shaft so that rotation of the shaft raises or lowers the respective poppet to open and close the wastegate port. The two shafts are concentrically arranged and are welded together at their ends remote from the poppet valves, at which point they are connected to a common actuation lever, such that movement of the lever rotates both shafts together, to simultaneously open or close the wastegate ports. Although the shafts are welded together at one end, they are torsionally independent which is intended to allow the shafts to separately accommodate tolerance build up or deformation of the valve seats to enable each poppet to seat correctly when closed.

Whilst the more recent dual wastegate valve mechanisms proposed in U.S. Pat. Nos. 5,046,317 and 5,996,348 address shortcomings in earlier proposals, they are relatively complicated mechanisms and are prone to wear.

It is an object of the present invention to provide an improved dual wastegate valve mechanism that provides opening and closing of dual wastegate ports.

SUMMARY

According to the present invention there is provided a turbocharger wastegate valve assembly comprising:

a first bypass port communicating with a first portion of an exhaust inlet;

a first valve member adapted for engaging and sealing a first valve seat surrounding the first bypass port;

a second bypass port communicating with a second portion of an exhaust inlet;

a second valve member adapted for engaging and sealing a second valve seat surrounding the second port;

a shaft supporting each valve member for rotation about a shaft axis to lift both the first and second valve members from sealing engagement with the first and second valve seats respectively;

wherein the first valve seat is inclined relative to the second valve seat and the shaft has freedom of movement in an axial direction.

With the present invention, the reaction forces exerted on the valve members (preferably poppets) have a component in the axial direction of the shaft which by virtue of the freedom of movement of the shaft in the axial direction provides a centering action.

The valve seats may lie in planes which are inclined either toward one another (in a "V" shape) or away from one another (in an inverted "V" shape).

The valve seats preferably incline at an angle greater than 90° (included angle).

Each valve seat is preferably equidistant from a line of intersection of the respective valve seat planes, but alternatively one valve seat may be closer to said line of intersection than the other.

The axial direction of the shaft preferably extends in a direction parallel to a plane containing a line joining the centers of the two valve seats, and in the case of valve seats equidistant from the line of intersection of the respective planes it is preferably parallel to a line joining the centers of the two valve seats. Alternatively, the valve seats may be off set relative to the axis, so that one valve seat is closer to the axis than the other.

The valve members are preferably loosely secured to the support shaft to enable a certain degree of freedom of movement of each valve member to improve seating. However, the valve members may be rigidly secured to the shaft (or more preferably a support portion extending laterally from the shaft).

Other alternative, and preferred, features of the present invention will be apparent from the following description.

BRIEF DESCRIPTION OF THE DRAWINGS

An embodiment of the present invention will now be described, by way of example only, with reference to the accompanying drawings in which.

DETAILED DESCRIPTION OF THE ILLUSTRATED EMBODIMENTS

Figure 1:
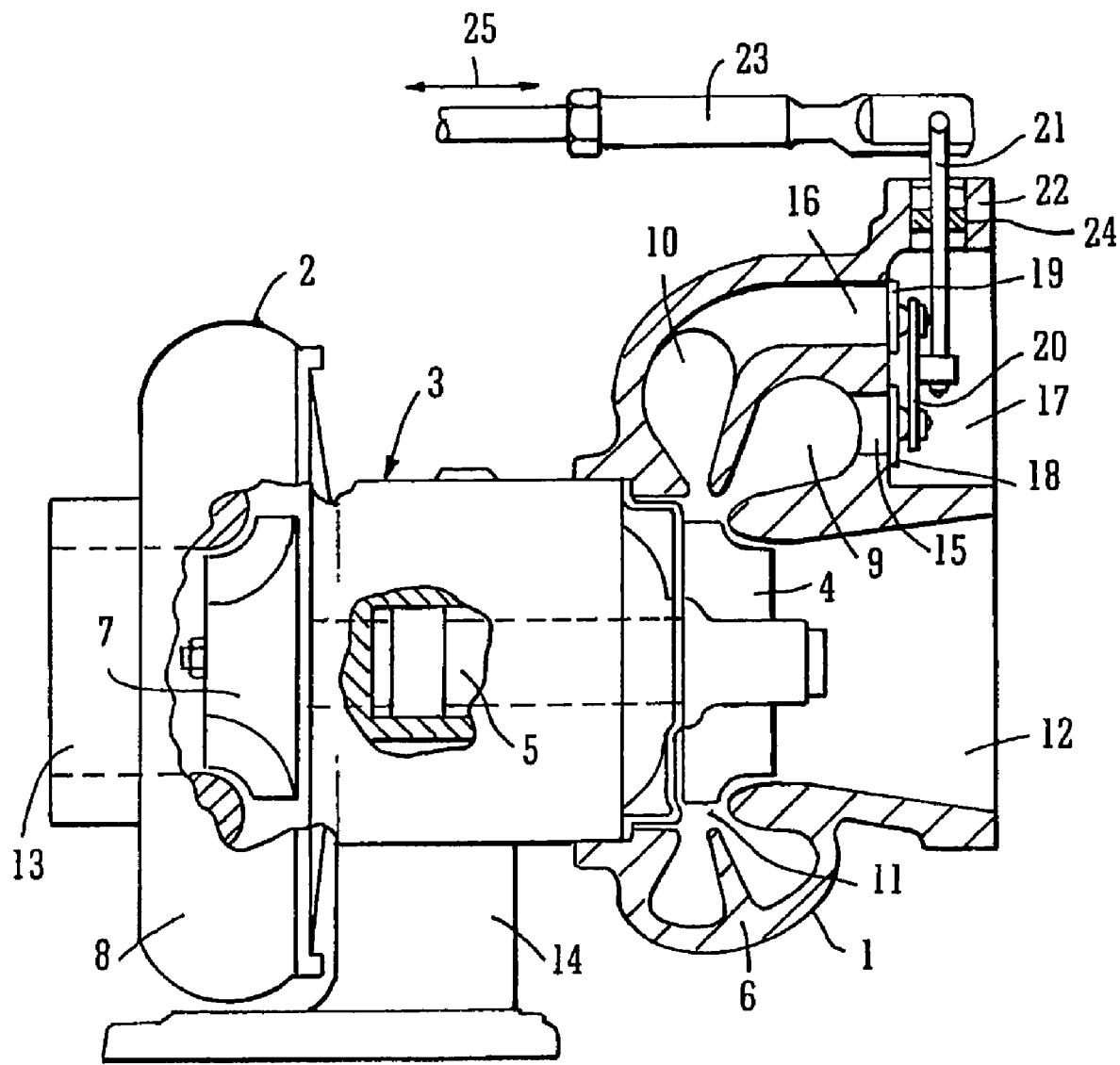
FIG. 1 schematically illustrates a prior art turbocharger with a dual wastegate valve assembly.

Referring to FIG. 1, this illustrates a turbocharger provided with a divide turbine inlet and twin wastegate valve assembly as disclosed in U.S. Pat. No. 5,046,317 referred to above. The illustrated turbocharger comprises a turbine 1 and a compressor 2 interconnected by a central bearing housing 3. The turbine 1 comprises a turbine wheel 4 mounted on one end of a turbo shaft 5 within a turbine housing 6. The compressor 2 comprises a compressor wheel 7 mounted on the other end of the turbo shaft 5 within a compressor housing 8. The turbo shaft 5 rotates about the turbocharger axis on bearing assemblies (not shown) located within the bearing housing 3.

The turbine housing defines a divided inlet volute having parallel exhaust gas inlet paths 9 and 10 which deliver exhaust gas to the turbine wheel 4 via an annular inlet passage 11 and exits the turbine housing via an axial outlet passage 12.

The compressor housing 2 defines an axial inlet 13 and an outlet volute 14.

Exhaust gas flow through the turbine 1 causes rotation of the turbine wheel 4 which in turn rotates the compressor wheel 7 mounted to the opposite end of the turbo shaft 5. As the compressor wheel 7 rotates, air is drawn in through the axial inlet 13, and delivered to cylinders of a combustion engine (not shown) via outlet volute 14 at a boosted pressure.

The turbine 1 is a wastegated turbine and as such each exhaust gas inlet path 9 and 10 is provided with a respective wastegate port 15 and 16 which communicate with a bypass gas passage 17 via a dual wastegate valve assembly. The dual wastegate valve assembly comprises a pair of wastegate valve members, i.e. poppets 18 and 19 loosely mounted to opposite ends of a linking support member 20. Each poppet has a limited freedom of movement allowing the precise position of each poppet to shift slightly to accommodate small variations in the height of the respective valve seats defined around the opening of each outlet bypass port 9,10.

The support member 20 is mounted to one end of the support arm 21 which extends through a wall 22 of the turbine housing and is connected at its opposite end to an actuator arm 23. A bushing 24 is provided in the turbine housing wall 22 to accommodate rotation of the support arm 21.

The end of the support arm 21 which is fixed to the support member 20 is bent at right angles to the axis of rotation of the support arm 21. The opposite end of the support arm 21 is linked to the actuator arm 25 so that reciprocal movement of the actuator arm (as indicated by arrow 25) causes rotation of the support arm 21 which in turn moves the linking support member 20 and the poppets 18,19 to simultaneously open or close the wastegate ports 9,10. The tip of the support arm 21 is secured to the support member 20 so as to allow limited angular movement between the two. In particular, the pivotal connection between the tip of the support arm 21 and the support member 20 is intended to provide a centering action to improve accurate seating of the poppets.

The wastegate valve assembly is controlled to open as boost pressure produced by the compressor 2 reaches a predetermined level to permit a portion of exhaust gas flowing through the turbine inlet paths 9 and 10 to bypass the turbine wheel 4 and thus limit any further increase in boost pressure produced by the compressor. The bypass gas passage 17 may communicate to atmosphere (as suggested in U.S. Pat. No. 5,046,317) or may for instance communicate with the turbine outlet passage 12 so that the bypass gas flow merges with the main exhaust gas flow downstream of the turbine wheel 4.

Figure 2:
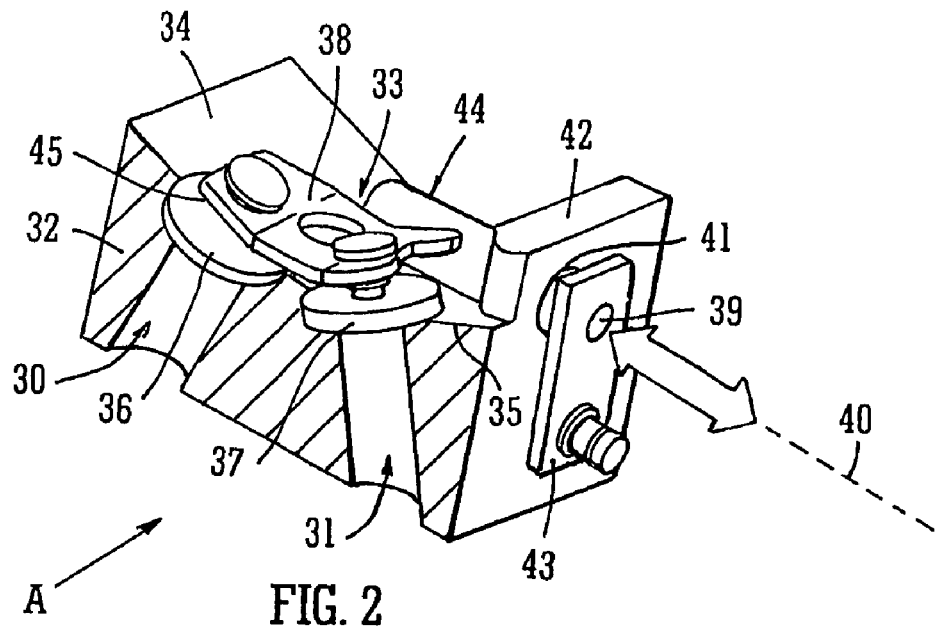
FIG. 2 schematically illustrates a dual wastegate valve assembly according to a first embodiment of the present invention.
Figure 3:
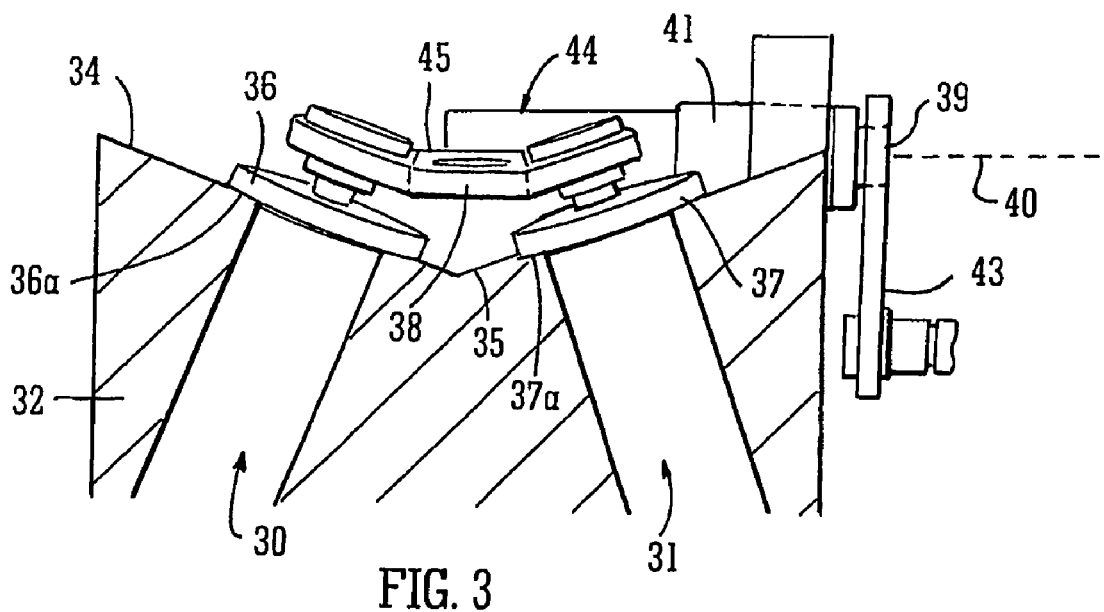
FIG. 3 is a side elevation of the dual wastegate valve assembly of FIG. 2.

Referring now to FIGS. 2 and 3, these illustrate a dual wastegate port and valve assembly according to the present invention. Only those details relevant to the invention are described. For instance, other details of the turbocharger, such as the construction of the turbine housing and the parallel exhaust gas inlet paths, and the manner in which the wastegate ports communicate with the inlet paths, may be entirely conventional and could for instance have the general structure illustrated in FIG. 1.

FIG. 2 is a perspective section through part of a turbocharger turbine housing illustrating dual wastegate ports 30 and 31 extending through a housing wall 32 and a dual wastegate valve assembly 33 according to the present invention. FIG. 3 is a view in the direction of arrow A in FIG. 2. It will be understood that the wastegate ports 30 and 31 communicate with respective exhaust gas flow paths (not shown) of a divided turbine inlet (not shown) which may for instance have substantially the same structure as that shown in FIG. 1.

The wastegate port 30 opens at a first surface 34 of the turbine wall 32 and the wastegate port 31 opens at a second surface 35 of a turbine wall 32. The second wall surface 35 is inclined toward the first surface 34 forming a shallow V shape. Accordingly, respective valve seats defined on surfaces 34 and 35 around the opening of each wastegate port 30,31 are preferably similarly inclined toward each other so that the plane of one valve seat meets the plane of the other valve seat at a line substantially equispaced between the centers of the openings of the wastegate ports 31,32.

The wastegate valve assembly 33 comprises a pair of wastegate valve members, in this case poppets 36 and 37, fixed to a valve member support 38 mounted on one end of a valve shaft 39 for rotation therewith. The valve shaft 39 extends along an axis 40 which is preferably parallel to, but laterally offset from, a line joining the centers of the openings of each valve port 30 and 31. The shaft 39 is supported for rotation about the axis 40 by a bushing 41 fitted in a bore through a housing wall portion 42. A radially extending lever arm 43 is secured to the end of the shaft 39 opposite the valve member support 38.

The valve member support 38 comprises a sleeve portion 44 securely fixed to the shaft 39 and a flag portion 45 extending laterally from the sleeve 44. Each valve member 36, 37 is secured to the support member flag portion 45 so that its sealing surface 36a, 37a lies in a plane parallel to the plane of the respective wastegate port valve seat. The valve members 36 and 37 are preferably "loosely" secured to the support member 38, to allow a limited freedom of movement about an axis perpendicular to the plane of the respective valve seat, for instance to accommodate minor distortions in the valve member support 38 relative to the surfaces 34 and 35 of the housing wall 32. In the illustrated embodiment this is achieved by loosely riveting each valve member to the support member 38 in a conventional manner.

In accordance with the invention, the shaft 39 is axially slidable within the bushing 41, and has a freedom of movement in the axial direction limited by the abutment of the sleeve 44 and bushing 41 on one side of the wall member 42, and the lever arm 43 and the bushing 41 on the opposite side of the wall member 42.

In use, a wastegate valve actuator (not shown) is linked to the lever arm 43 in order to reciprocate the lever arm 43 through a small angle to rotate the shaft 39 sufficiently to open and close the wastegate ports 30 and 31. For instance, the actuator may be a conventional pneumatic actuator linked to the lever arm 43 by an actuating arm (not shown) which reciprocates in response to pressure in the turbine compressor. There are many examples of such actuators in the art. Typically, the actuator will be spring biased to maintain the wastegate valve in a closed position unless the spring bias is overcome by boost pressure transmitted to the actuator thus causing the wastegate valve to open. However, other forms of actuator, such as electric actuators controlled in accordance with monitored boost pressure, could also be used. Rotations of the lever arm 43 through a small angle in a clockwise direction as shown in FIG. 2 will rotate the shaft 39, which will in turn rotate the valve member support 38 about the shaft axis 40 to lift the valve members 36 and 37 to open the wastegate ports 30 and 31.

Actuating force applied to the lever arm in a anti-clockwise direction as shown in FIG. 2 will close the wastegate ports 30 and 31 by seating the valve members 36 and 37 on respective housing surfaces 34 and 35. The loose connection of the valve members 36 and 37 to the valve member support 38 will allow each valve member to shift slightly to accommodate minor deformation or wear in the valve or support 38 seats. In addition, the combination of the inclined valve seats and the freedom of the shaft to move along its axis will tend to center the valve members on their valve seats as force is applied to maintain the valve members in a closed position.

The present invention therefore provides a dual wastegate port and valve assembly which provides for accurate seating of each valve member using a mechanically simple and robust mechanism.

Figure 4:
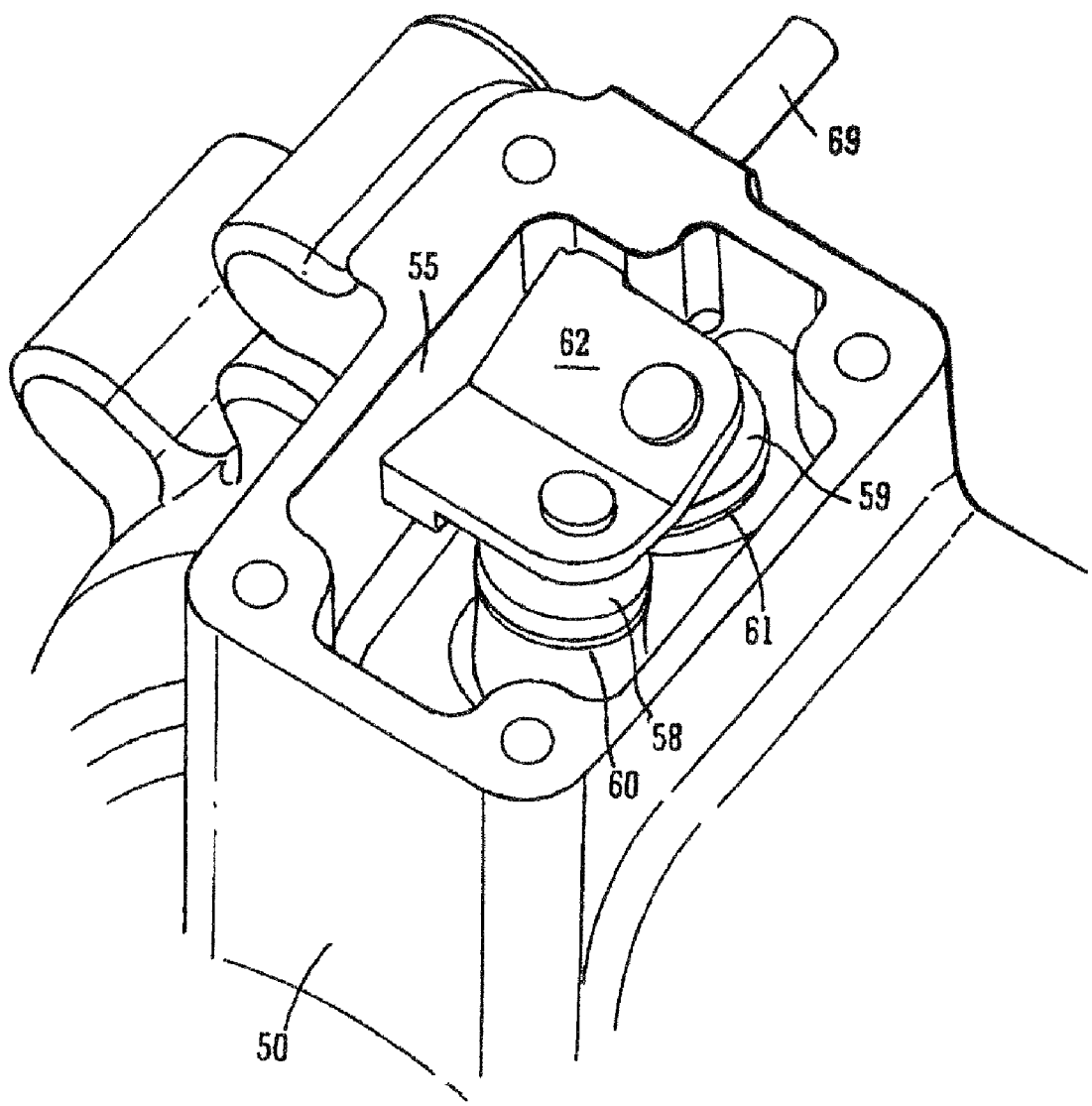
FIG. 4 is a schematic illustration of a second embodiment of a wastegate valve assembly according to the present invention.
Figure 5:
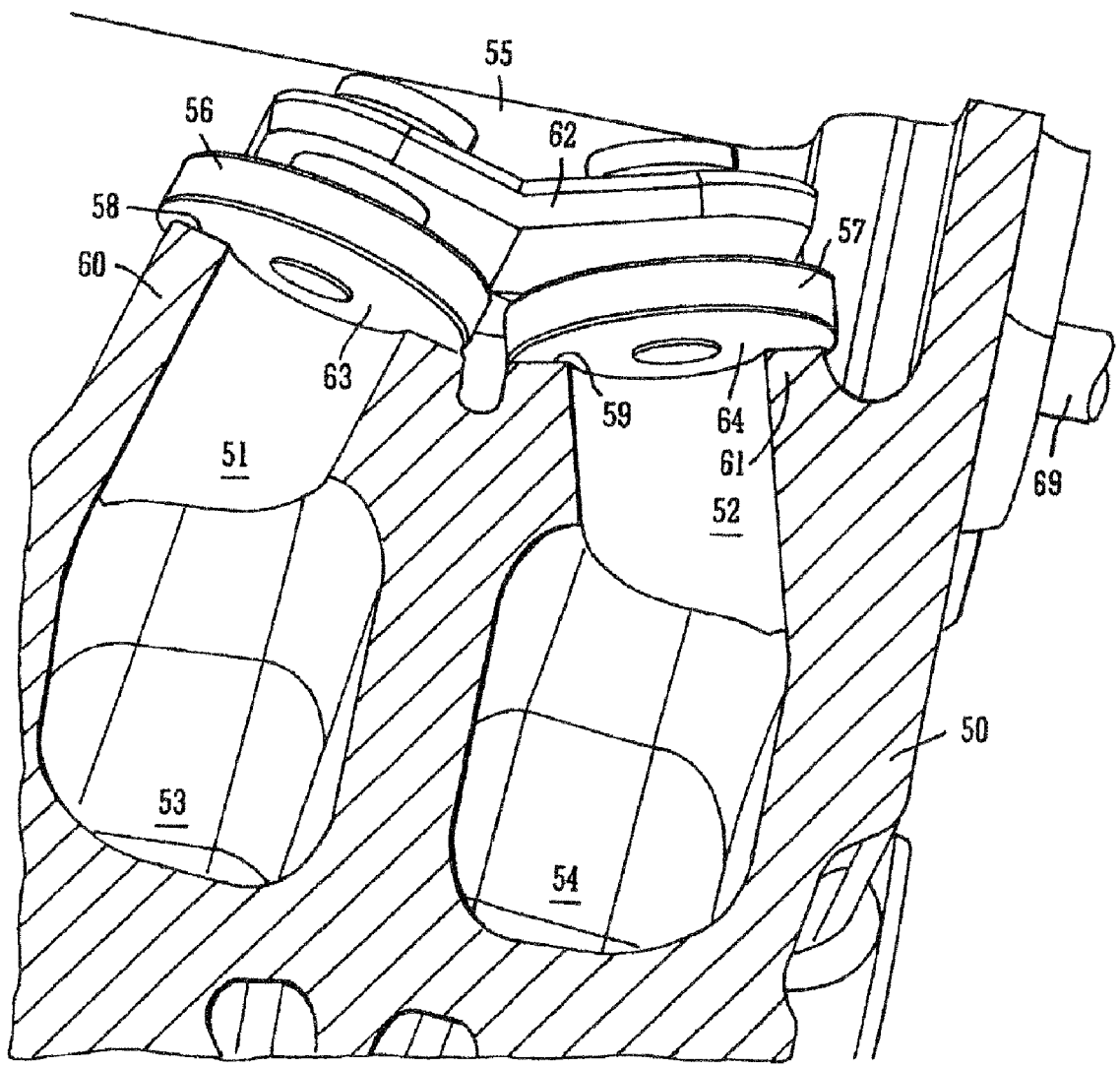
FIG. 5 is a cross sectional view of the wastegate valve assembly of FIG. 4.

FIGS. 4 and 5 illustrate a second embodiment of the present invention. FIG. 4 is a perspective view from above and FIG. 5 is a sectional view, of a part of the turbine housing 50 defining dual wastegate ports 51 and 52 communicating between respective exchange gas inlet paths 53 and 54 and a bypass passage 55. A dual wastegate valve assembly comprising valve members 56 and 57 seated on inclined wastegate port valves seats 58, 59 defined by bosses 60 and 61. As shown in the cross sectional view of FIG. 5, the valve seats 58 and 59 defined by the bosses 60 and 61, respectively, lie in preferably mutually inclined planes. Similarly, the valve members 56 and 57 are mounted to a valve member support 62 so that their sealing surfaces 63 and 64 lie (with some limited freedom and movement) in mutually inclined planes parallel to the valve seat planes.

The valve member support 62 is mounted for rotation on one end of a shaft 69 and operates in the manner described in relation to the embodiment of FIGS. 3 and 4.

In the above described embodiments of the invention, the valve member support links the two valve members and has angled portions to which each valve member is mounted. However, in other embodiments each valve member could be mounted to a respective support arm extending from the sleeve portion rather than being directly linked.

With the above described embodiments of the invention the valve seats defined at the opening of each wastegate port are inclined toward one another. In alternative embodiments of the invention the valve seats may be inclined away from one another in an inverted V shape. In addition, the orientation of the wastegate ports in the illustrated examples is perpendicular to each of the valve seats. This need not necessarily be the case, rather the wastegate ports may be angled with respect to the respective valve seats. Other modifications will be apparent to the appropriately skilled person.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

The invention claimed is:

1. A turbocharger wastegate valve assembly comprising:
a first bypass port communicating with a first portion of an exhaust inlet;
a first valve member engaging and sealing a first valve seat surrounding the first bypass port;
a second bypass port communicating with a second portion of an exhaust inlet;
a second valve member engaging and sealing a second valve seat surrounding the second port; and
a shaft supporting each valve member for rotation about a shaft axis to lift both the first and second valve members from sealing engagement with the first and second valve seats respectively;
wherein:
the first valve seat is inclined relative to the second valve seat and the shaft has freedom of movement in the axial direction;
the first valve seat lies in a first plane and the second valve seat lies in a second plane; and
said shaft axis extends in a direction substantially orthogonal to a direction of a line of intersection of the first and second planes.

2. A turbocharger wastegate valve assembly comprising:
a first bypass port communicating with a first portion of an exhaust inlet;
a first valve member engaging and sealing a first valve seat surrounding the first bypass port;
a second bypass port communicating with a second portion of an exhaust inlet;
a second valve member engaging and sealing a second valve seat surrounding the second port; and
a shaft supporting each valve member for rotation about a shaft axis to lift both the first and second valve members from sealing engagement with the first and second valve seats respectively;
wherein:
the first valve seat is inclined relative to the second valve seat and the shaft has freedom of movement along the shaft axis limited by abutment formations defined by or secured to portions of the shaft on respective axial sides of a bushing supporting the shaft;
the first valve seat lies in a first plane and the second valve seat lies in a second plane; and
said shaft axis extends in a direction substantially orthogonal to a direction of a line of intersection of the first and second planes.

3. The turbocharger wastegate valve assembly of claim 2, wherein a first abutment formation of the abutment formations comprises a sleeve.

4. The turbocharger wastegate valve assembly of claim 2, wherein a first abutment formation of the abutment formations comprises a lever arm.

5. A turbocharger wastegate valve assembly comprising:
a first bypass port communicating with a first portion of an exhaust inlet;
a first valve member engaging and sealing a first valve seat surrounding the first bypass port;
a second bypass port communicating with a second portion of an exhaust inlet;
a second valve member engaging and sealing a second valve seat surrounding the second port; and
a shaft supporting each valve member for rotation about a shaft axis to lift both the first and second valve members from sealing engagement with the first and second valve seats respectively;
wherein:
the first valve seat is inclined relative to the second valve seat and the shaft has freedom of movement along the shaft axis limited by a sleeve and a bushing in a first direction along the shaft axis and limited by an arm and the bushing in a second direction along the shaft axis;
the first valve seat lies in a first lane and the second valve seat lies in a second plane; and
said shaft axis extends in a direction substantially orthogonal to a direction of a line of intersection of the first and second planes.

6. The wastegate valve assembly according to claim 5, wherein the first and second planes are inclined toward one another to form a "V"-shaped structure.

7. The wastegate valve assembly according to claim 5, wherein, the first and second planes are inclined away from one another to form a "Λ"-shaped structure.

8. The wastegate assembly according to claim 5, wherein the valve seats are equispaced from the line of intersection of the first and second planes.

9. The wastegate valve assembly according to claim 5, wherein said shaft axis is substantially parallel to a plane containing a line joining the centres of each bypass port.

10. The wastegate valve assembly according to claim 5, wherein said shaft axis is substantially parallel to a line joining the centres of each bypass port.

11. The wastegate valve assembly according to claim 5, wherein the first valve port and valve member are farther from the shaft than the second valve port and valve member.

12. The wastegate valve assembly according to claim 5, wherein each valve member is secured to a support portion extending laterally from said shaft.

13. The wastegate valve assembly of claim 12, wherein each valve member is mounted to the support member so as to have a freedom of movement.

14. The wastegate valve assembly according to claim 12, wherein each valve member is mounted to a common support.

15. An apparatus comprising:
a turbine comprising an exhaust gas net passageway divided into a first portion and a second portion and further comprising a wastegate valve assembly, wherein the wastegate valve assembly comprises:

a first bypass port communicating with a first portion of the exhaust inlet passageway;

a first valve member engaging and sealing a first valve seat surrounding the first bypass port;

a second bypass port communicating with a second portion of the exhaust inlet passageway;

a second valve member engaging and sealing a second valve seat surrounding the second port; and a shaft supporting each valve member for rotation about a shaft axis to lift both the first and second valve members from sealing engagement with the first and second valve seats respectively;

wherein:

the first valve seat is inclined relative to the second valve seat and the shaft has freedom of movement along the shaft axis limited by abutment formations defined by or secured to portions of the shaft on respective axial sides of a bushing supporting the shaft;

the first valve seat lies in a first plane and the second valve seat lies in a second plane; and said shaft axis extends in a direction substantially orthogonal to a direction of a line of intersection of the first and second planes.

16. The apparatus according to claim 15, further comprising a turbocharger, the turbocharger comprising the turbine.

17. The wastegate valve assembly according to claim 15, wherein each valve member is secured to a support portion extending laterally from said shaft.

18. The wastegate valve assembly according to claim 15, wherein said shaft extends through the bushing supported in a bore through a wall.

19. A turbine comprising an exhaust gas inlet passageway divided into a first portion and a second portion and further comprising a wastegate valve assembly comprising:

a first bypass port communicating with a first portion of an exhaust inlet;

a first valve member engaging and sealing a first valve seat surrounding the first bypass port;

a second bypass port communicating with a second portion of an exhaust inlet;

a second valve member engaging and sealing a second valve seat surrounding the second port; and a shaft supporting each valve member for rotation about a shaft axis to lift both the first and second valve members from sealing engagement with the first and second valve seats respectively;

wherein:

the first valve seat is inclined relative to the second valve seat and the shaft has freedom of movement in a direction along the shaft axis limited by a plurality of abutment formations;

the first valve seat lies in a first plane and the second valve seat lies in a second plane;

said shaft axis extends in a direction substantially orthogonal to a direction of a line of intersection of the first and second planes;

each valve member is secured to a support portion extending laterally from said shaft;

each valve member is mounted to a common support; and a first abutment formation of the abutment formations is defined by a lever arm connected to an end of the shaft for rotation thereof, and a second abutment formation of the abutment formations is defined by part of a support member provided for supporting said valve members on said shaft.

20. A turbocharger wastegate valve assembly comprising:

a first bypass port communicating with a first portion of an exhaust inlet;

a first valve member engaging and sealing a first valve seat surrounding the first bypass port;

a second bypass port communicating with a second portion of an exhaust inlet;

a second valve member engaging and sealing a second valve seat surrounding the second port; and a shaft supporting each valve member for rotation about a shaft axis to lift both the first and second valve members from sealing engagement with the first and second valve seats respectively;

wherein:

the first valve seat is inclined relative to the second valve seat and the shaft has freedom of movement in the axial direction; and the first valve seat lies in a first plane and the second valve seat lies in a second plane, the first and second planes being inclined away from one another to form a "Λ"-shaped structure.

* * * * *